United States Patent
Kim et al.

(10) Patent No.: US 10,326,160 B2
(45) Date of Patent: Jun. 18, 2019

(54) CATHODE AND LITHIUM BATTERY USING THE SAME

(71) Applicants: Myung-hoon Kim, Seoul (KR);
Kyu-sung Park, Suwon-Si (KR);
Min-sik Park, Hwaseong-si (KR);
Jin-hwan Park, Seoul (KR)

(72) Inventors: Myung-hoon Kim, Seoul (KR);
Kyu-sung Park, Suwon-Si (KR);
Min-sik Park, Hwaseong-si (KR);
Jin-hwan Park, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 568 days.

(21) Appl. No.: 13/653,702

(22) Filed: Oct. 17, 2012

(65) Prior Publication Data
US 2013/0130103 A1    May 23, 2013

(30) Foreign Application Priority Data
Nov. 18, 2011    (KR) .................... 10-2011-0121191

(51) Int. Cl.
*H01M 4/50* (2010.01)
*H01M 10/0525* (2010.01)
(Continued)

(52) U.S. Cl.
CPC .... *H01M 10/0525* (2013.01); *C01G 45/1228* (2013.01); *C01G 45/1264* (2013.01);
(Continued)

(58) Field of Classification Search
CPC ...... H01M 4/364; H01M 4/485; H01M 4/505; H01M 4/525; H01M 10/0525
(Continued)

(56) References Cited

U.S. PATENT DOCUMENTS

| 5,616,437 A * | 4/1997 | Gao .................... H01M 4/13 |
| | | 29/623.5 |
| 6,677,082 B2 | 1/2004 | Thackeray et al. |

(Continued)

FOREIGN PATENT DOCUMENTS

| CN | 101022161 | 8/2007 |
| CN | 101662025 | 3/2010 |

(Continued)

OTHER PUBLICATIONS

Air Cathodes for Metal Air Batteries and Fuel Cells, Martin et al., 2009, IEEE Electrical Power and Energy Conference.*
(Continued)

*Primary Examiner* — Ula C Ruddock
*Assistant Examiner* — Frank A Chernow
(74) *Attorney, Agent, or Firm* — Cantor Colburn LLP

(57) ABSTRACT

A cathode and a battery including a cathode active material including a layer-structured material having a composition of $xLi_2MO_3-(1-x)LiMeO_2$; and a metal oxide having a perovskite structure. The cathode active material may have improved structural stability by intermixing a metal oxide having a similar crystalline structure with the layer-structured material, and thus, life and capacity characteristics of a cathode and a lithium battery including the metal oxide may be improved.

8 Claims, 6 Drawing Sheets

(51) Int. Cl.

| | | |
|---|---|---|
| *H01M 4/36* | (2006.01) | |
| *H01M 4/485* | (2010.01) | |
| *H01M 4/505* | (2010.01) | |
| *H01M 4/525* | (2010.01) | |
| *C01G 45/12* | (2006.01) | |
| *C01G 51/00* | (2006.01) | |
| *C01G 53/00* | (2006.01) | |
| *H01M 10/04* | (2006.01) | |
| *H01M 4/131* | (2010.01) | |

(52) U.S. Cl.
CPC ............. *C01G 51/70* (2013.01); *C01G 53/70* (2013.01); *H01M 4/364* (2013.01); *H01M 4/485* (2013.01); *H01M 4/505* (2013.01); *H01M 4/525* (2013.01); *C01P 2002/34* (2013.01); *C01P 2002/72* (2013.01); *C01P 2002/88* (2013.01); *C01P 2004/03* (2013.01); *C01P 2004/61* (2013.01); *C01P 2004/62* (2013.01); *C01P 2004/82* (2013.01); *H01M 4/131* (2013.01); *H01M 10/0422* (2013.01)

(58) Field of Classification Search
USPC ....................................................... 429/231.6
See application file for complete search history.

(56) References Cited

U.S. PATENT DOCUMENTS

| 7,135,352 | B2 | 11/2006 | Yokajty | |
| 7,303,840 | B2 | 12/2007 | Thackeray et al. | |
| 7,314,682 | B2 | 1/2008 | Thackeray et al. | |
| 7,435,402 | B2 | 10/2008 | Kang et al. | |
| 7,479,352 | B2 | 1/2009 | Yoon et al. | |
| 7,935,270 | B2 | 5/2011 | Park | |
| 9,312,564 | B2 | 4/2016 | Park | |
| 2002/0018936 | A1* | 2/2002 | Suzuki | H01M 2/164 |
| | | | | 429/247 |
| 2006/0099508 | A1* | 5/2006 | Thackeray et al. | 429/231.1 |
| 2008/0266031 | A1* | 10/2008 | Uematsu | H01L 23/49838 |
| | | | | 333/247 |
| 2010/0173199 | A1 | 7/2010 | Hiraki et al. | |
| 2012/0015231 | A1 | 1/2012 | Takamori et al. | |
| 2012/0219859 | A1* | 8/2012 | Doe | C01B 25/372 |
| | | | | 429/219 |

FOREIGN PATENT DOCUMENTS

| JP | 2001266879 A | 9/2001 |
| JP | 2005093371 A | 4/2005 |
| JP | 2007227199 A | 9/2007 |
| JP | 2010086935 A | 4/2010 |
| JP | 2010-251289 | 11/2010 |
| KR | 1020090030087 A | 3/2009 |
| KR | 1020090066021 A | 6/2009 |
| KR | 20100032395 A | 3/2010 |
| KR | 1020100032395 A | 3/2010 |
| KR | 20110094980 A | 8/2011 |

OTHER PUBLICATIONS

Extended EP Search Report, dated Feb. 19, 2015; EP Publication No. 2595234 A2; Samsung Electronics Co., Ltd.; 6 pages.

Gim, Jihyeon, et al.; Synthesis and Characterization of Integrated Layered Nanocomposites for Lithium Ion Batteries; Nanoscale Research Letters, Jan. 1, 2012, pp. 1-9, XP055167931.

Johnson, C.S., et al.; Structural and Electrochemical Evaluation of (1-x)Li2TiO3.(x)LiMn0.5Ni0.5O2 Electrodes for Lithium Batteries; Journal of Power Sources, Elsevier SA, CH, vol. 119-121, Jun. 1, 2003, pp. 139-144; XP004430155.

Martin, J.J., et al.; Air Cathodes for Metal-Air Batteries and Fuel Cells; Electrical Power & Energy Conference (EPEC), IEEE, Piscataway, NJ, Oct. 22, 2009, pp. 1-6; XP031642215.

Yanhuai Ding et al., Effect of rare earth elements doping on structure and electrochemical properties of LiNi1/3Co1/3Mn1/3O2 for lithium-ion battery, 2007, pp. 967-971, Solid State Ionics 178, Elsevier.

Paromita Ghosh et al., Lanthanum-doped LiCoO2 cathode with hight rate capability, 2009, p. 1654-1661, Electrochimica Acta 54, Elsevier.

European Office Action for Application No. 12192632.3 dated Jan. 24, 2019, citing the above reference(s).

Korean Office Action Issued in KR Application No. 10-2011-0121191, dated Jan. 21, 2019, 50 Pages.

* cited by examiner

CATHODE AND LITHIUM BATTERY USING THE SAME

CROSS-REFERENCE TO RELATED APPLICATION

This application claims the benefit of Korean Application No. 10-2011-0121191, filed Nov. 18, 2011, in the Korean Intellectual Property Office, the disclosure of which is incorporated herein by reference.

BACKGROUND

1. Field

Aspects of the present invention relate to a cathode and a lithium battery using the same, and more particularly, to a cathode with improved electrical characteristics and a lithium battery that uses the cathode.

2. Description of the Related Art

In general, transition metal compounds such as $LiNiO_2$, $LiCoO_2$, $LiMn_2O_4$, $LiFePO_4$, $LiNi_xCo_{1-x}O_2$ (0<x<1), and $LiNi_{1-x-y}Co_xMn_yO_2$ (0≤x≤0.5, 0≤y≤0.5) are used as cathode active materials for lithium batteries.

Next generation lithium batteries can be accomplished by improving high-rate discharge performance and high discharge capacity characteristics of the cathode active materials. As portable electronic devices are becoming more complex and diverse in view of their functions, high performance lithium secondary batteries are highly desired. To address these concerns, along with the design of battery systems and advanced battery manufacturing technology, improvement of battery materials is necessary.

A $xLi_2MO_3$-(1-x)$LiMeO_2$ (0≤x≤1; M, Me=a metal ion) complex system, which is a high-capacity cathode material of the next generation, may increase structural instability when a cut-off voltage is increased for high-capacity utilization.

SUMMARY

Aspects of the present invention provide a cathode, including a cathode active material, with improved electrical characteristics.

Aspects of the present invention provide a lithium battery including the cathode.

According to an aspect of the present invention, the cathode active material includes a layer-structured material having a composition of $xLi_2MO_3$-(1-x)$LiMeO_2$, wherein 0<x<1, and M and Me are each a metal ion; and a metal oxide having a perovskite structure.

The layer-structured material and the metal oxide may form a complex.

The metal oxide may be intermixed in a crystalline structure of the layer-structured material.

The metal oxide may have a composition of $ABO_3$, wherein A and B are each a metal ion.

Me may be one or more transition metals.

M may be one or more elements including aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chrome (Cr), strontium (Sr), scandium (Sc), yttrium (Y), or rare earth elements.

A may include one or more Group 2 elements or rare earth elements (Group 3).

A may further include one or more of lanthanum (La), Sr, barium (Ba), or Ca.

B may include one or more transition metals.

B may further include one or more of Ti, V, Cr, Mn, Fe, Co, Ni, Mg, or Cu.

The metal oxide may include at least one from $LaNiO_3$, $LaCoO_3$, $LaMnO_3$, $LaMgO_3$, $LaFeO_3$, $SrNiO_3$, $SrCoO_3$, $SrMnO_3$, $SrMgO_3$, $SrFeO_3$, $BaNiO_3$, $BaCoO_3$, $BaMnO_3$, $BaMgO_3$, $BaFeO_3$, $CaNiO_3$, $CaCoO_3$, $CaMnO_3$, $CaMgO_3$ and $CaFeO_3$.

The metal oxide may have a concentration of about 0.01 mol % to about 1 mol % based on 1 mol of the layer-structured material.

The metal oxide may have a concentration of about 0.01 mol % to about 0.1 mol % based on 1 mol of the layer-structured material.

According to another aspect of the present invention, a cathode includes a cathode active material formed on the surface of a current collector, wherein the cathode active material may include a layer structured material having a composition of $xLi_2MO_3$-(1-x)$LiMeO_2$, wherein 0<x<1, and M and Me are each a metal ion; and a metal oxide having a perovskite structure.

According to another aspect of the present invention, a lithium battery includes a cathode; an anode; and an organic electrolyte solution, wherein the cathode may include a cathode active material formed on the surface of a current collector, wherein the cathode active material may include a layer structured material having a composition of $xLi_2MO_3$-(1-x)$LiMeO_2$, wherein 0<x<1, and M and Me are each a metal ion; and a metal oxide having a perovskite structure.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
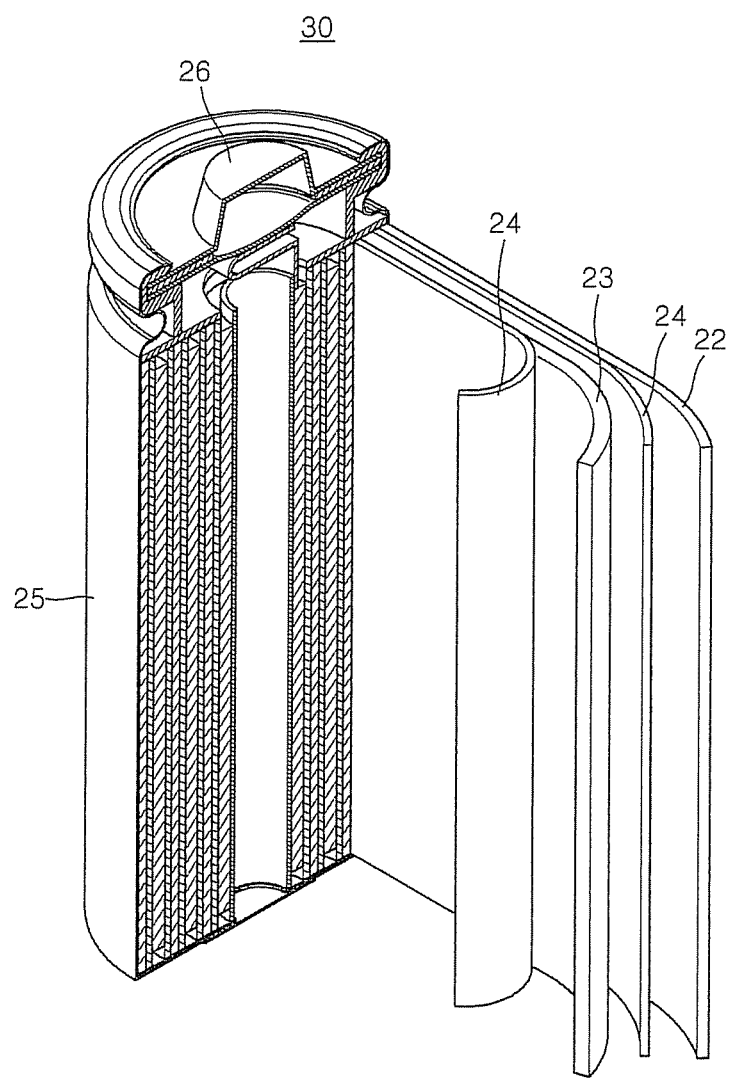
FIG. 1 schematically illustrates the structure of a lithium battery according to an embodiment of the present invention.

Reference will now be made in detail to the present embodiments of the present invention, examples of which are illustrated in the accompanying drawings, wherein like reference numerals refer to the like elements throughout.

The embodiments are described below in order to explain the present invention by referring to the figures.

A cathode active material according to an embodiment of the present invention may include a layer-structured material having a composition of $xLi_2MO_3$-$(1-x)LiMeO_2$; and a metal oxide having a perovskite structure, in which, $0<x<1$, and M and Me are each a metal ion.

A $xLi_2MO_3$-$(1-x)LiMeO_2$ ($0 \leq x \leq 1$; M, Me=a metal ion) complex system, which is one of the high-capacity cathode active materials of the next generation, is generally composed of $Li_2MO_3$ and a layer-structured complex of $LiMeO_2$. Excess lithium exists as a substituted form in the transition metal layer. The complex system should be charged at about 4.5 V (vs. Li), or higher, in order to achieve a high capacity, and thus stability at high voltages is important. The complex consists of the structure $xLi_2MO_3$-$(1-x)MeO_2$ during an initial charge cycle of up to 4.4 V due to lithium deintercalation from $LiMeO_2$ and forms the structure $(x-\delta)Li_2MO_3$-$\delta MeO_2$-$(1-x)MO_2$ along with $Li_2O$ at 4.4 V or higher. That is, at 4.4 V or higher, $Li_2O$ is formed due to lithium and oxygen deintercalation from $Li_2MO_3$ at the same time and $MO_2$ is also produced. The description above is represented in Chemical Equation 1.

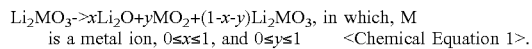
$Li_2MO_3 \rightarrow xLi_2O + yMO_2 + (1-x-y)Li_2MO_3$, in which, M is a metal ion, $0 \leq x \leq 1$, and $0 \leq y \leq 1$    <Chemical Equation 1>.

In the reaction above, the remaining content of $Li_2MnO_3$ is determined according to a cut-off voltage of charge, and thus, if the cut-off voltage is increased for high-capacity utilization, then the remaining content of $Li_2MnO_3$ decreases. Compositions of $Li_2MnO_3$ serve to stabilize the structure of the complex. Therefore, when the cut-off voltage is increased, the remaining content of $Li_2MnO_3$ decreases, and as a result, there is a high possibility for the complex to become structurally unstable.

According to an embodiment of the present invention, the charge-discharge efficiency may be increased, and life characteristics may be improved during high-voltage charge by using a perovskite-based metal oxide, for example an $ABO_3$-based material, where A and B are each identical or different metal ions, as a stabilizer phase material that may maintain the structure of the complex at a charged state.

The metal oxide, which is the stabilizer phase material, has a stable crystalline structure, has a conductivity of lithium ions, and has a perovskite structure compatible with the layer-structured material which has the composition of $xLi_2MO_3$-$(1-x)LiMeO_2$. The crystalline structure of the metal oxide is of similar type to the layer-structured material, which may improve stability of the layer-structured material without hindering free movements of lithium ions in a cathode material.

The cathode active material, including the stabilizer phase material as described above, may include a complex material including the $xLi_2MO_3$-$(1-x)LiMeO_2$-based material having a layered structure, wherein $0<x<1$, and M and Me are each a metal ion; and the metal oxide having a perovskite structure.

An example of the metal oxide having a perovskite structure includes the $ABO_3$-based material, wherein A and B are metal ions. A may include one or more Group 2 elements or rare earth elements. A may further include one or more of lanthanum (La), strontium (Sr), barium (Ba), and calcium (Ca). B may include one or more transition metals. B may further include one or more of titanium (Ti), vanadium (V), chrome (Cr), manganese (Mn), iron (Fe), cobalt (Co), nickel (Ni), magnesium (Mg), or copper (Cu).

In the $xLi_2MO_3$-$(1-x)LiMeO_2$-based material, M is a metal ion which may include one or more of aluminum (Al), gallium (Ga), germanium (Ge). Mg, niobium (Nb), zinc (Zn), cadmium (Cd), Ti, Co, Ni, potassium (K), sodium (Na), Ca, silicon (Si), Fe, Cu, tin (Sn), V, boron (B), phosphorus (P), selenium (Se), bismuth (Bi), arsenic (As), zirconium (Zr), Mn, Cr, Sr, scandium (Sc), yttrium (Y), or rare earth elements. For example, M may include at least Mn.

In the $xLi_2MO_3$-$(1-x)LiMeO_2$-based material, Me may include one or transition metals. Me may further include one or more of Ti, V, Cr, Mn, Fe, Co, Ni, or Cu.

The $ABO_3$-based material, which is a metal oxide having a perovskite structure, may be in the ratio of about 0.01 mol % to about 1 mol %, for example, about 0.01 mol % to about 0.1 mol % based on 1 mol of the $xLi_2MO_3$-$(1-x)LiMeO_2$-based material. Sufficient stability may be provided during high-voltage charge of the $xLi_2MO_3$-$(1-x)LiMeO_2$-based material within the ranges above.

A material including the $xLi_2MO_3$-$(1-x)LiMeO_2$-based material having a layered structure and the metal oxide having a perovskite structure forms a complex. Furthermore, the metal oxide having a perovskite structure may be intermixed into the crystalline structure of the $xLi_2MO_3$-$(1-x)LiMeO_2$-based material.

The average diameter of the complex including both the $xLi_2MO_3$-$(1-x)LiMeO_2$-based material having a layered structure and the metal oxide having a perovskite structure may be from about 0.1 μm to about 10 μm, for example, from about 0.2 μm to about 3 μm.

The complex including both the $xLi_2MO_3$-$(1-x)LiMeO_2$-based material having a layered structure and the metal oxide having a perovskite structure may be obtained by using a combustion Synthesis method. The combustion synthesis method may be any known method commonly used in the art.

An example of the combustion synthesis method for obtaining the complex may include heating the solution that is formed by dissolving a precursor of each metal composition for a desired time to remove a polymer composition.

A lithium battery according to another embodiment includes a cathode, an anode, and an electrolyte solution, in which the cathode includes a complex material including the layer-structured material having the composition of $xLi_2MO_3$-$(1-x)LiMeO_2$ (in which, x, M, and Me are as defined above) and the metal oxide having a perovskite structure.

The type of the lithium battery is not limited and may include, for example, a secondary lithium battery, such as a lithium ion battery, a lithium-ion polymer battery, or a lithium-sulfur battery, and a primary lithium battery.

The cathode includes a current collector and a cathode active material layer formed on the current collector. In order to form the cathode, a cathode active material composition is prepared by mixing a cathode active material, that includes a complex material including both the $xLi_2MO_3$-$(1-x)LiMeO_2$-based material having a layered structure and the metal oxide having the perovskite structure, a conducting agent, a binder, and a solvent.

A cathode plate may be manufactured by forming the cathode active material layer by directly coating the cathode active material composition on an aluminum current collector and drying. Alternatively, the cathode active material layer is formed by casting the cathode active material composition on a separate support, delaminating a film obtained from the support, and laminating the film on the current collector. The cathode manufacturing methods above are known in the art.

For the solvent, N-methylpyrrolidone, acetone, or water may be used, but the solvent is not limited thereto.

The binder included in the cathode active material layer serves to attach cathode active material particles to one another and attach the cathode active material to the current collector. Examples of the binder include polyvinyl alcohol, carboxymethyl cellulose, hydroxypropyl cellulose, diacetyl cellulose, polyvinyl chloride, carboxylated polyvinyl chloride, polyvinyl fluoride, polymer including ethylene oxide, polyvinylpyrrolidone, polyurethane, polytetrafluoroethylene, polyvinylidene fluoride (PVDF), polyethylene, polypropylene, styrene-butadiene rubber, acrylated styrene-butadiene rubber, epoxy resin, or nylon, but is not limited thereto.

The conducting agent included in the cathode active material is used to induce conductivity of an electrode. This may include any electronic conductive material that does not cause chemical change in the construction of a battery. An example of the conductor may be a carbon-based material such as natural graphite, artificial graphite, carbon black, acetylene black, or carbon fiber; a metal-based material such as metal powder or metal fiber of Cu, Ni, Al, or Ag; a conductive material including a conductive polymer such as polyphenylene derivative; or a mixture thereof.

The current collector may be aluminum, but is not limited thereto.

As the cathode plate is manufactured, an anode active material composition may be manufactured by mixing an anode active material, a conducting agent, a binder, and a solvent. An anode plate may then be manufactured by directly coating the anode active material composition on a copper current collector. Alternatively the anode active material composition is cast on a separate support and then an anode active material film, which is delaminated from the support, is laminated on the copper current collector. Concentrations of the anode active material, the conductor, the binder, and the solvent are at concentrations commonly used in a lithium battery.

The anode active material may be a material capable of intercalating/deintercalating lithium. For example, lithium metal or lithium alloy, coke, artificial graphite, natural graphite, the combusted body of an organic polymer compound, or carbon fiber may be used. Also, materials for the conducting agent, the binder, and the solvent may be the same materials used in the case of the cathode as described above.

Depending on the case, pores may be formed inside the electrode plate by adding a plasticizer to the cathode or anode active material composition.

Depending on the type of lithium battery, a separator between the cathode and the anode may be present. Any separator commonly used in a lithium battery may be used. Particularly, a material with low resistance in regard to electrolyte ion movement and having excellent electrolyte-absorbability is appropriate for the separator. The material may include glass fiber, polyester, polyethylene, polypropylene, polytetrafluoroethylene (PTFE), or a combination thereof, each of which may be a non-woven or woven fabric. For example, a lithium ion battery may include a rollable separator made of materials such as polyethylene or polypropylene, and a lithium ion polymer battery may include a separator with an excellent organic electrolyte solution containing ability.

The separator may be prepared by the following method. A separator film may be formed by preparing a separator composition by mixing a polymer resin, a filler, and a solvent, directly coating the separator composition on the electrode, and drying. Alternatively, the separator may be formed by casting the separator composition on a support, drying, delaminating the separator film from the support, and laminating the separator film on the electrode.

The polymer resin is not particularly limited, and any material used in the field for a binder of an electrode plate may be used. For example, vinylidene fluoride/hexafluoropropylene copolymer, PVDF, polyacrylonitrile, polymethylmethacrylate, or a mixture thereof may be used. Particularly, vinylidene fluoride/hexafluoropropylene copolymer containing hexafluoropropylene may be used with a concentration of about 8 weight % to about 25 weight %.

According to an embodiment of the present invention, a battery structure may be formed by disposing the separator between the cathode plate and the anode plate as described above. The lithium ion battery may be completed by winding or folding the battery structure, inserting the battery structure into a cylindrical battery case or a box-shaped battery case and injecting an organic electrolyte solution. The lithium ion polymer battery may be completed by stacking the battery in a bi-cell structure, impregnating the structure with organic electrolyte solution and sealing the resultant in a pouch.

FIG. 1 schematically illustrates a structure of the lithium battery 30 according to an embodiment of the present invention. As shown in FIG. 1, the lithium battery 30 is composed of the cathode 23, the anode 22, the separator 24 disposed between the cathode 23 and the anode 22, an electrolyte (not shown) impregnated in the cathode 23, the anode 22, and the separator 24, the battery case 25, and the sealer 26 to seal the battery case 25 as main parts. The lithium battery 30 is composed by sequentially stacking the cathode 23, the anode 22, and the separator 24, and by spirally winding and storing the stacked cathode 23, the anode 22, and the separator 24 in the battery case.

Hereinafter, the present invention will be explained in detail with Examples and a Comparative Example.

COMPARATIVE EXAMPLE

Preparation of a Cathode Active Material

A composition of a cathode active material was $0.5Li[Li_{1/3}Mn_{2/3}]O_2$-$0.5LiNi_{1/3}Co_{1/3}Mn_{1/3}O_2$, and its manufactured powder was synthesized by using the following combustion synthesis method.

First, as a starting material, lithium carbonate, nickel acetate, cobalt acetate, and manganese acetate were measured to satisfy the stoichiometry above and were dissolved in 200 ml of a dilute nitric acid aqueous solution. Then, 15 ml of a citric acid aqueous solution and 15 ml of ethylene glycol were added to prepare a sol. The sol was stirred and heated on a hot plate to evaporate the water, and thus the mixture was obtained in a gel state. The gel was heated on a hot plate until it burned, and an additional heat treatment was performed after completely decomposing the gel by combustion. The additional heat treatment was performed at a temperature of 950° C. for 5 hours with a dry air flow, and thus a cathode active material powder of $0.5Li[Li_{1/3}Mn_{2/3}]O_2$-$0.5LiNi_{1/3}Co_{1/3}Mn_{1/3}O_2$ was prepared.

Preparation of a Cathode

The $0.5Li[Li_{1/3}Mn_{2/3}]O_2$-$0.5LiNi_{1/3}Co_{1/3}Mn_{1/3}O_2$ cathode active material powder and a carbon conducting material (carbon black) were homogenously mixed in a weight ratio of 93:3, and then, a PVDF solution was added as a binder to prepare a slurry with a weight ratio of the cathode active material to the carbon conducting material to the binder equaling 93:3:4. A cathode plate was prepared by coating the slurry on aluminum foil with a thickness of 15 μm and drying.

Preparation of a Battery

A coin cell was prepared by additionally vacuum drying the cathode plate. Metal lithium was used as a counter electrode during the coin cell preparation, and 1.3M LiPF$_6$ ethylene carbonate/EC)/diethyl carbonate (DEC)/ethyl methyl carbonate (EMC)=3/5/2 (a volume ratio) was used as an electrolyte.

Example 1

Preparation of a Cathode Active Material

A cathode active material was synthesized by using the following combustion synthesis method. First, as a starting material, lithium carbonate, nickel acetate, cobalt acetate, manganese acetate, and lanthanum(III) nitrate hexahydrate were measured to satisfy the stoichiometry and were dissolved in 200 ml of a dilute nitric acid aqueous solution. Then, 15 ml of a citric acid aqueous solution and 15 ml of ethylene glycol were added to prepare a sol. The sol was stirred and heated on a hot plate to evaporate the water, and thus the mixture was obtained in a gel state. The gel heated on the hot plate until it was burned, and an additional heat treatment was performed after completely decomposing the gel by combustion. The additional heat treatment was performed at a temperature of 950° C. for 5 hours with a dry air flow, and thus a cathode active material powder of $0.5Li[La_{0.01}Li_{0.32}Mn_{0.67}]O_2\text{-}0.5LiNi_{1/3}CO_{1/3}Mn_{1/3}O_2$, including the slightest quantity of $LaNiO_3$, $LaCoO_3$, and $LaMnO_3$, was prepared.

Preparation of a Cathode

The cathode active material powder and a carbon conducting material (carbon black) were homogenously mixed in a weight ratio of 93:3. Then, a PVDF solution was added as a binder to prepare a slurry with a weight ratio of the cathode active material to the carbon conducting material to the binder equaling 93:3:4. The cathode plate was prepared by coating the slurry on aluminum foil with a thickness of 15 μm and drying.

Preparation of a Battery

A coin cell was prepared by additionally vacuum drying the cathode plate. Metal lithium was used as a counter electrode during the coin cell preparation, and 1.3M LiPF$_6$ EC/DEC/EMC=3/5/2 was used as an electrolyte.

Example 2

Preparation of a Cathode Active Material

A cathode active material was synthesized by using the following combustion synthesis method. First, as a starting material, lithium carbonate, nickel acetate, cobalt acetate, manganese acetate, and lanthanum(III) nitrate hexahydrate were measured to satisfy the stoichiometry and were dissolved in 200 ml of a dilute nitric acid aqueous solution. Then, 15 ml of a citric acid aqueous solution and 15 ml of ethylene glycol were added to prepare a sol. The sol was stirred and heated on a hot plate to evaporate the water, and thus the mixture was obtained in a gel state. Combustion of the gel was also performed on the hot plate, and an additional heat treatment was performed after completely decomposing the gel by combustion. The additional heat treatment was performed at a temperature of 950° C. for 5 hours with a dry air flow, and thus, a cathode active material powder of $0.5Li[La_{0.01}Li_{0.32}Mg_{0.02}Mn_{0.65}]O_2\text{-}0.5LiNi_{1/3}Co_{1/3}Mn_{1/3}O_2$, including the slightest quantity of $LaNiO_3$, $LaCoO_3$, $LaMnO_3$, and $LaMgO_3$, was prepared.

Preparation of a Cathode

The cathode active material powder and a carbon conducting material (carbon black) were homogenously mixed in a weight ratio of 93:3, and then, a PVDF solution was added as a binder to prepare a slurry with a weight ratio of the cathode active material to the carbon conducting material to the binder equaling 93:3:4. A cathode plate was prepared by coating the slurry on an aluminum foil with a thickness of 15 μm and drying.

Preparation of a Battery

A coin cell was prepared by additionally vacuum drying the cathode plate. Metal lithium was used as a counter electrode during the coin cell preparation, and 1.3M LiPF$_6$ EC/DEC/EMC=3/5/2 was used as an electrolyte.

Experimental Example 1

Analysis of Crystalline Structure

Figure 2:
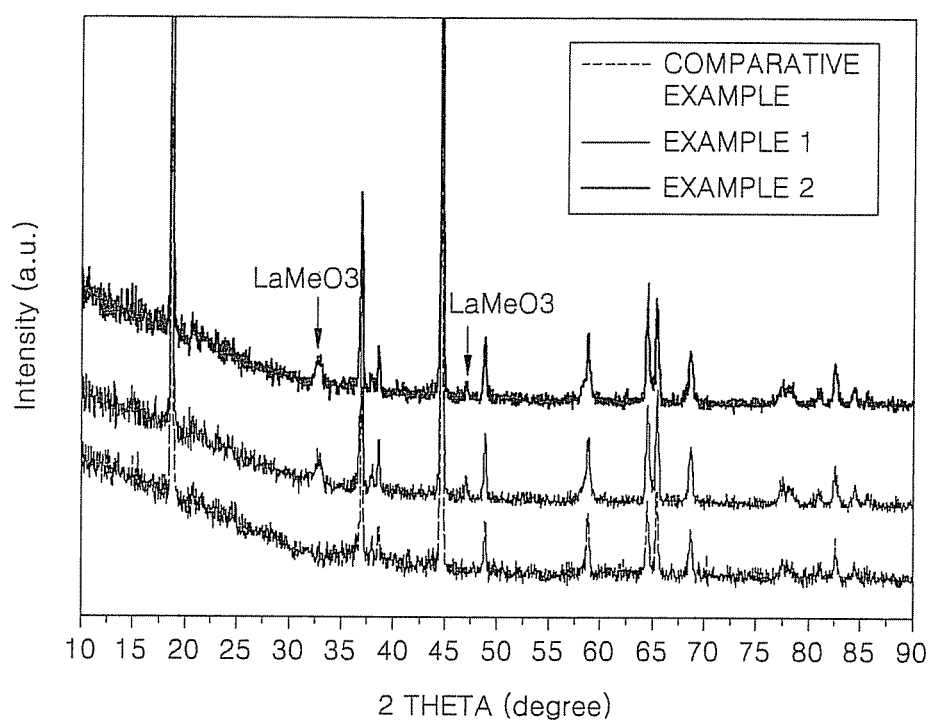
FIG. 2 is a graph illustrating the XRD results of the Comparative Example and Examples 1 and 2.

FIG. 2 illustrates the results of the X-ray Diffraction (XRD) analysis of the cathode active materials obtained in the Comparative Example and Examples 1 and 2. From the XRD analysis of FIG. 2, the cathode active material of Example 1 had a secondary state which included $LaNiO_3$, $LaCoO_3$, and $LaMnO_3$ of a perovskite structure. The cathode active material of Example 2 included $LaNiO_3$, $LaCoO_3$, $LaMnO_3$, and $LaMgO_3$ of a perovskite structure.

Peak positions of the $LaNiO_3$, $LaCoO_3$, $LaMnO_3$, and $LaMgO_3$ are as follows:

$LaNiO_3$: 32.893 (110), 33.191 (012), 47.332 (202);
$LaCoO_3$: 33.015 (110), 33.421 (104), 47.596 (024);
$LaMnO_3$: 32.412 (112), 45.668 (220), 47.280 (221); and
$LaMgO_3$: 32.608 (121), 32.702 (200), 46.740 (202).

Experimental Example 2

Analysis of Lanthanum Structure

Figure 3A:
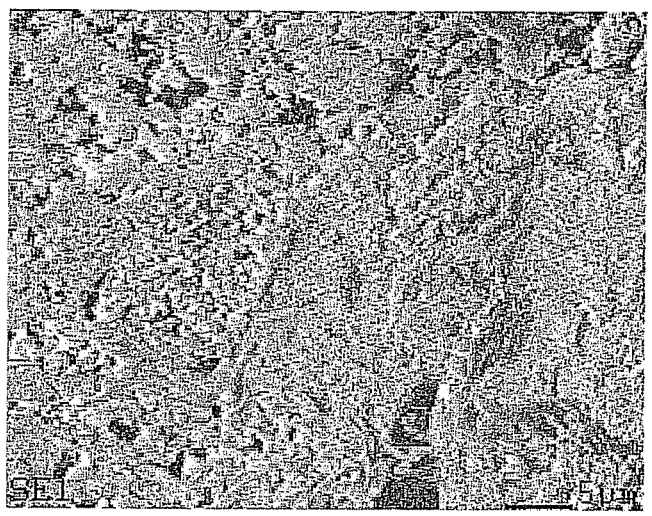
FIGS. 3A and 3B are the SEM EDS images of the positive electrode (cathode) obtained in Example 1.
Figure 3B:
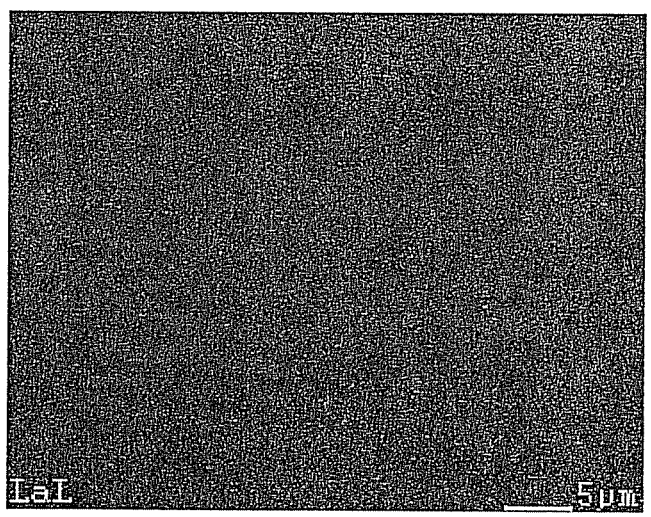

The Scanning Electron Microscopy with Energy Dispersive X-Ray Spectrometer (SEM/EDS) images of the cathode electrodes prepared by using the cathode active material obtained in Example 1 are shown in FIGS. 3A and 3B. From the results of FIGS. 3A and 3B, lanthanum (La) distribution on the cathode electrode is confirmed.

Experimental Example 3

Evaluation of Electrical and Chemical Characteristics

Electrical and chemical characteristics of the lithium batteries obtained in the Comparative Example and Examples 1 and 2 were evaluated.

An evaluation of the electrical and chemical characteristics was performed at room temperature (25° C.) and at a high temperature (45° C.). For charge/discharge conditions, the batteries were charged with 0.5 C of constant current until the voltage reached 4.6 V, and constant voltage was induced and maintained until the current was dropped to 0.05 C during charge. The batteries were discharged with 0.5 C of constant current until the voltage reached 2 V during discharge.

Figure 4:
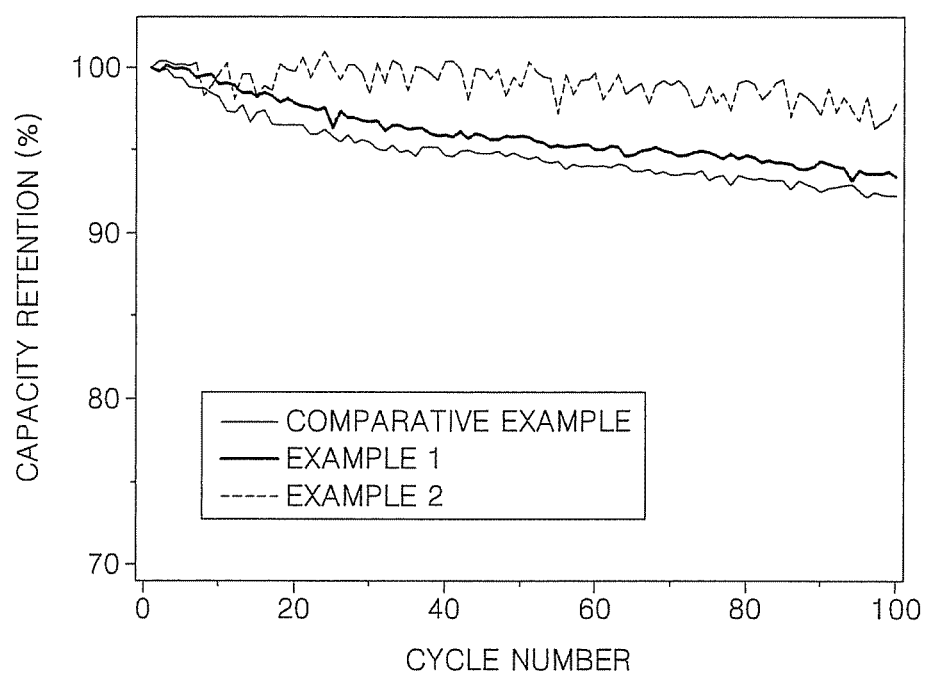
FIG. 4 is a graph illustrating the cycle characteristics at room temperature of the batteries obtained in the Comparative Example and Examples 1 and 2.
Figure 5:
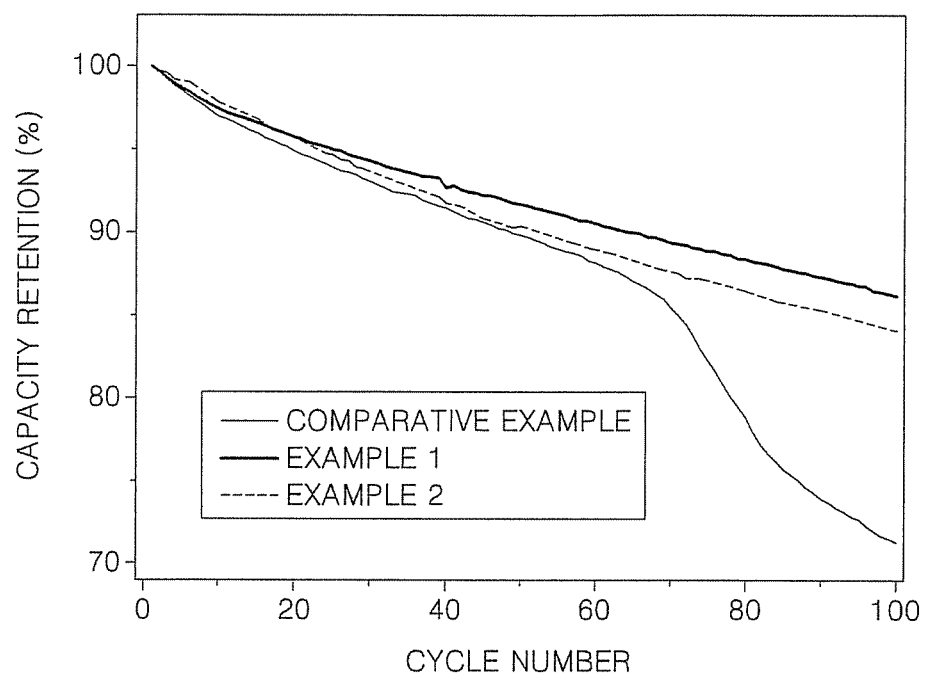
FIG. 5 is a graph illustrating the cycle characteristics at high temperature of the batteries obtained in the Comparative Example and Examples 1 and 2.

The characteristics at room temperature and a high temperature are illustrated in FIGS. 4 and 5. As shown in FIG. 4, after 100 cycles of repetition, life characteristics at room temperature increased to 93% in Example 1 and increased to 97% in Example 2 compared to 92% for the Comparative Example. As shown in FIG. 5, after 100 cycles of repetition, life characteristics at a high temperature increased to 86% in Example 1 and increased to 84% in Example 2 compared to 71% for the Comparative Example. Also, a large capacity decrease was observed in the Comparative Example after the 70$^{th}$ cycle, but was not observed in Examples 1 and 2.

Figure 6:
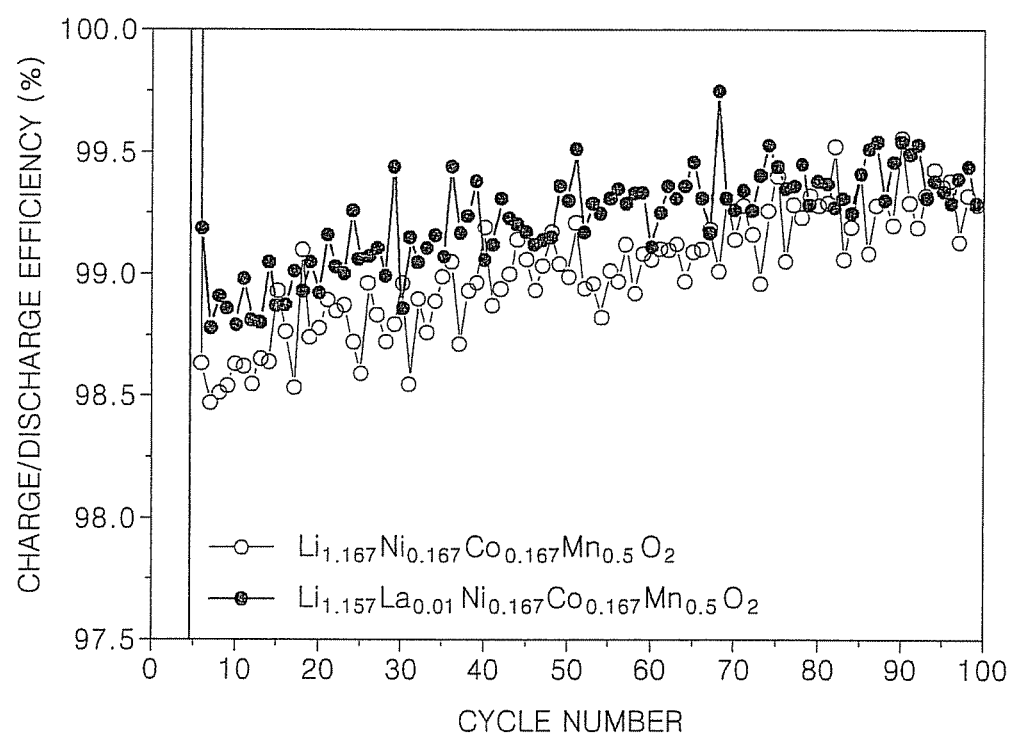
FIG. 6 is a graph illustrating the charge/discharge characteristics at room temperature of the batteries obtained in the Comparative Example and Examples 1 and 2.

FIG. 6 illustrates charge/discharge efficiency at room temperature of the batteries of the Comparative Example and Example 1. As shown in FIG. 6, the battery of Example 1 shows the results being about 0.5% greater than the battery of the Comparative Example at initial cycles. Further, the battery of Example 1 shows the results of improved charge/discharge efficiency in cycles.

Therefore, improved life time/span and capacity characteristics of the cathode active materials of Examples 1 and 2 which include a perovskite-based metal oxide are confirmed.

Experimental Example 4

Evaluation of Thermal Stability

Thermal stability was measured by using a differential scanning calorimeter (DSC) for the batteries of Comparative Example and Examples 1 and 2, and results are shown in Table 1.

TABLE 1

| Class | Initial Heating Temperature (° C.) | Peak Temperature (° C.) | Heat of Reaction (J/g) | |
|---|---|---|---|---|
| | | | Around Peak | 100~350° C. |
| Comparative Example | 200 | 258.8 | 1332 | 1547 |
| Example 1 | 225 | 261.1 | 1108 | 1525 |
| Example 2 | 210 | 278.5 | 904.2 | 1568 |

As shown in Table 1, the batteries of Examples 1 and 2 have higher initial heating temperatures and peak temperatures than the battery of Comparative Example. Heating values are not much different over the whole temperature range, but heating values of Examples 1 and 2 around the peaks are lower than that of Comparative Example. Accordingly, the cathode active materials of Examples 1 and 2 including the perovskite-based metal oxide have improved thermal stabilities.

As described above, according to one or more of the above embodiments of the present invention, when preparing a cathode plate of $xLi_2MO_3$-$(1-x)LiMeO_2$ ($0 \leq x \leq 1$; M, Me=metal ion) complex, which is one of the high-capacity cathode materials for the next generation, charge/discharge efficiency and life characteristics may be improved by mixing in a perovskite structured-metal oxide which may structurally stabilize the complex, and thus electrical and chemical characteristics of the lithium battery using the complex may be improved.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium battery comprising:
   an anode;
   an organic electrolyte solution; and
   a cathode comprising a cathode active material formed on a surface of a current collector, wherein the cathode active material comprises:
   a layer-structured material having a composition of $xLi_2MO_3$-$(1-x)LiMeO_2$, wherein $0 < x < 1$, and M and Me are each a metal ion; and
   a metal oxide having a perovskite structure, wherein the metal oxide has a composition of $ABO_3$; wherein A includes one or more of Group 2 elements or rare earth elements; wherein A is at least one of lanthanum, strontium, barium, or calcium; and wherein B includes one or more transition metals; and wherein B includes one or more elements selected from the group consisting of V, Cr, Mg, and Cu.

2. The lithium battery of claim 1, wherein Me is one or more transition metals.

3. The lithium battery of claim 1, wherein M is one or more of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), scandium (Sc), yttrium (Y), or rare earth elements.

4. The lithium battery of claim 1, wherein the metal oxide is at least one from $LaMgO_3$, $SrMgO_3$, $BaMgO_3$, and $CaMgO_3$.

5. The lithium battery of claim 1, wherein the metal oxide has a concentration of about 0.01 mol % to about 1 mol % based on 1 mol of the layer-structured material.

6. The lithium battery of claim 1, wherein A and B are each a metal ion.

7. The lithium battery of claim 1, wherein the layer-structured material and the metal oxide form a complex.

8. The lithium battery of claim 1, wherein the metal oxide is intermixed in a crystalline structure of the layer-structured material.

* * * * *